United States Patent
Siira

Patent Number: 5,974,321
Date of Patent: Oct. 26, 1999

[54] METHOD FOR SELECTING A SIGNAL, AND A CELLULAR RADIO SYSTEM

[75] Inventor: Mikko Siira, Tokyo, Japan

[73] Assignee: Nokia Telecommunications Oy, Espoo, Finland

[21] Appl. No.: 08/774,781

[22] Filed: Dec. 30, 1996

[51] Int. Cl.$^6$ .................................................. H04Q 7/20
[52] U.S. Cl. .......................................... 455/442; 455/560
[58] Field of Search .................................. 455/422, 432, 455/436, 437, 438, 442, 524, 525, 560, 561, 67.1; 370/331, 332, 335, 342, 350, 503

[56] References Cited

U.S. PATENT DOCUMENTS

| | | | |
|---|---|---|---|
| 5,195,090 | 3/1993 | Bolliger et al. | 455/422 |
| 5,247,702 | 9/1993 | Su et al. | 455/517 |
| 5,268,933 | 12/1993 | Averbuch | 370/331 |
| 5,398,258 | 3/1995 | Su et al. | 370/342 |
| 5,586,119 | 12/1996 | Scribano et al. | 370/350 |
| 5,722,074 | 2/1998 | Muszynski | 455/442 |

*Primary Examiner*—Dwayne D. Bost
*Assistant Examiner*—Quochien B Vuong
*Attorney, Agent, or Firm*—Pillsbury Madison & Sutro

[57] ABSTRACT

The invention relates to a transmission method and a cellular radio system comprising base stations and at least one vocoder. The base stations and the vocoder transmit a signal to each other. The base stations transmit a signal to the vocoder substantially simultaneously, the vocoder receiving the simultaneously transmitted signals at different moments of reception. The cellular radio system comprises comparing means for comparing the moments of reception of the signals to a predetermined time window, measuring means for measuring and comparing the quality of the received signals, and selection means for selecting a signal on the basis of the aforementioned signal measurement and comparison.

15 Claims, 3 Drawing Sheets

Reverse-side

METHOD FOR SELECTING A SIGNAL, AND A CELLULAR RADIO SYSTEM

FIELD OF THE INVENTION

The invention relates generally to telecommunication systems. More precisely, the invention relates to a digital cellular radio system employing a soft hand-off.

BACKGROUND OF THE INVENTION

A typical cellular radio system comprises a fixed base station network, and a subscriber terminal communicates with one or more base stations of the network. A base station forwards the communication that arrives from a subscriber terminal. While moving or remaining stationary, subscriber terminals may transmit messages via the base stations both to each other and to subscriber terminals of other telephone systems. The transmission of messages is possible when the subscriber terminals are located in the coverage area of the base station network. In order for a subscriber terminal to be able to use the services provided by the cellular radio system, it should maintain a connection to at least one base station under all circumstances. When a subscriber terminal does not use the services provided by the base station network, it does not need a connection to the base station network but it listens to the base stations in an idle mode. When the subscriber terminal moves in the base station network from the coverage area of one base station to the coverage area of another base station, this creates a need to change the channel or the base station.

In a typical cellular radio system, a subscriber terminal communicates only with one base station at a time, even though especially for example in a CDMA system the subscriber terminal may also communicate simultaneously with several base stations. In a prior art soft hand-off, the connection to the base station network is maintained despite the hand-off. In such a hand-off, the base station is usually changed. The prior art also comprises a softer hand-off where the base station is not changed, but the sector of the base station used is changed. A soft and a softer hand-off are called make-before-break-type hand-offs, which means that a new connection is set up for the subscriber terminal before the connection to the previous base station is terminated. The frequency band used is not changed in either hand-off.

A cellular radio system usually comprises a TRAU (Transcoder/Rate Adaptor Unit) that is placed for example in connection with a base station controller or a mobile services switching centre. The TRAU source-encodes the signal and adapts the signal transmission rate to the transmission network, for example a Public Switched Telephone Network (PSTN). The TRAU forms TRAU frames that it transmits to the base station. The TRAU also acts as a speech coder, i.e. a vocoder. The coding of the signal reduces the signal data rate for example in a transmission line to the base station. The vocoder and the base station transmit to and receive from each other signals consisting of data packets that form TRAU frames.

In a soft hand-off, a subscriber terminal communicates with several base stations simultaneously. In a soft hand-off, the subscriber terminal transmits to the base station a signal comprising the same information, the signal being forwarded to the vocoder. Also, the subscriber terminal receives a signal comprising the same information from the base station, which has received this signal from the vocoder. In cellular radio systems, the signal routing from the vocoder to the different base stations varies considerably. This means that the lengths of the different transmission paths between the vocoder and a base station may vary greatly.

In a prior art arrangement, the base stations transmit signals that comprise the same information. The signals are routed via the vocoder for example to the base station controller or to the mobile services switching centre. If the signals consist of coded speech, the vocoder decodes the signal. If the signals consist for example of signalling, they are routed according to known technology to a network element that requires signalling. In a prior art cellular radio network, several signals containing the same information are transmitted over relatively long distances. However, the transmission of several signals containing the same information consumes the capacity of the transmission paths in the cellular radio network. Also, in a prior art arrangement the vocoder receives the signals containing the same information at different times. The reception of signals at different times causes problems in the further processing of the signals.

CHARACTERISTICS OF THE INVENTION

The object of the present invention is to realize a cellular radio system in such a way that the capacity of the radio system is increased by selecting the signals to be transmitted in the cellular radio system. Another object is to avoid problems caused by the reception of signals at different times.

This is achieved with a method according to the invention, the method being used in a cellular radio system comprising base stations and at least one vocoder, the base stations and the vocoder transmitting a signal to each other, the base stations transmitting a signal to the vocoder substantially simultaneously, and the vocoder receiving the simultaneously transmitted signals at different moments of reception, the method comprising the steps of comparing the moments of reception of the signals to a predetermined time window, and when a signal arrives during a predetermined time window, measuring and comparing the quality of the received signals and thereafter selecting a signal.

The invention also relates to a cellular radio system comprising base stations and at least one vocoder, the base stations and the vocoder transmitting a signal to each other, the base stations transmitting a signal to the vocoder substantially simultaneously, the vocoder receiving the simultaneously transmitted signals at different moments of reception, the cellular radio system comprising comparing means for comparing the moments of reception of the signals to a predetermined time window, measuring means for measuring and comparing the quality of the received signals, and selection means for selecting a signal on the basis of the aforementioned signal measurement and comparison.

The arrangement according to the invention provides several advantages especially in a soft hand-off. The arrangement employs a method wherein only the delay differences of the signals to be transmitted in the reverse direction are significant. The method comprises selecting the signal with the best quality that is forwarded via the vocoder. Further, the vocoder does not have to be synchronized with the base stations. In the arrangement according to the invention, the distance between the vocoder and the base stations is not significant for the invention. The arrangement also comprises transmitting a framed signal constituting a superframe, and the delay difference tolerance of the data packets can be increased by increasing the length of the superframe.

DESCRIPTION OF THE FIGURES

In the following, the invention will be described in greater detail with reference to the examples according to the accompanying drawings, in which.

DESCRIPTION OF THE PREFERRED EMBODIMENTS

Figure 1:
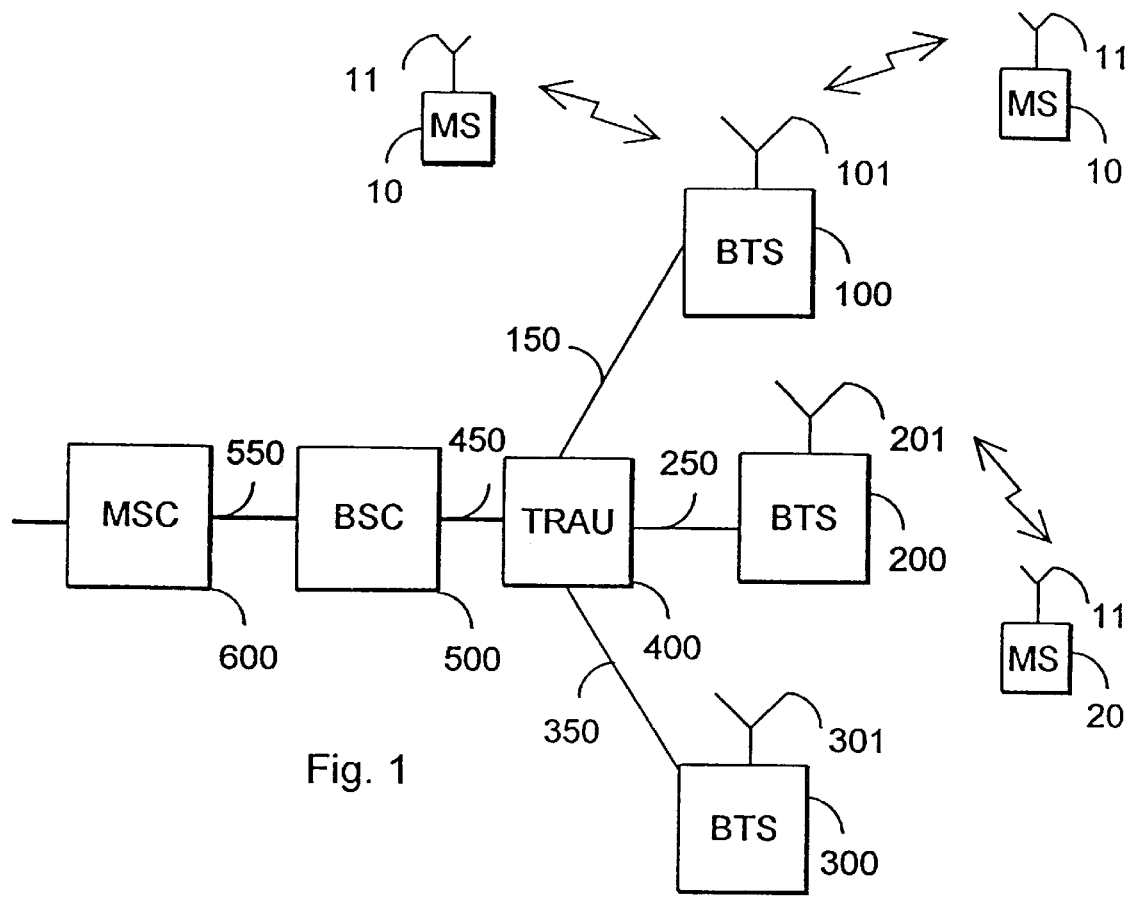
FIG. 1 shows a cellular radio system where the method according to the invention is utilized.

FIG. 1 shows a cellular radio system where the arrangement according to the invention is utilized. The arrangement according to the invention is applicable for use in spread spectrum systems, especially in CDMA systems, without restricting the invention to the aforementioned systems, however. The cellular radio system comprises a number of subscriber terminals 10, 20, base stations 100, 200, 300, a base station controller 500, and a prior art mobile services switching centre 600. The function of the base station controller 500 is to control the base stations 100, 200, 300. The cellular radio system further comprises a vocoder 400 that acts as a speech coder. In the arrangement shown in the figure, the vocoder 400 is placed in a TRAU. As regards speech coding, the vocoder 400 is realized according to known technology. The subscriber terminals 10 shown in the figure are in practice for example mobile phones.

The mobile services switching centre 600 is connected by a transmission line 550 to the base station controller 500, which is connected to the vocoder 400 by a transmission line 450. The vocoder 400 communicates via a transmission line 150 with the base station 100, via a transmission line 250 with the base station 200, and via a transmission line 350 with the base station 300. The transmission paths 150, 250, 350, 450 and 550 are implemented for example with PCM technique. These transmission paths can also be realized for example with radio links. In the arrangement shown in the figure, the vocoder 400 is placed between the base station controller 500 and the base stations 100, 200, 300. However, the vocoder 400 may also be located in some other part of the cellular radio system, for example in connection with the base station controller 500 or the mobile services switching centre 600.

Figure 2:
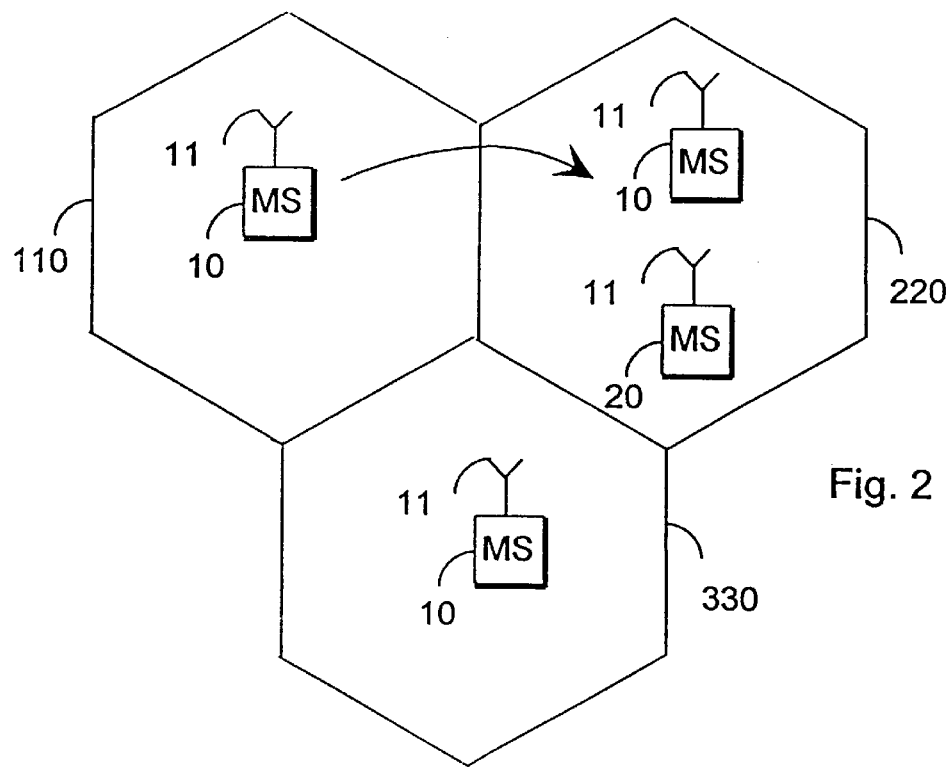
FIG. 2 shows the movement of a subscriber terminal in the cellular radio system during a hand-off.

FIG. 2 shows the movement of a subscriber terminal in the cellular radio system during a hand-off. The figure shows that each base station 100, 200, 300 has its own coverage area 110, 210, 310. The subscriber terminal 10 moves at first in the coverage area 110 of the base station 100. If the subscriber terminal 10 sets up a connection to some other subscriber terminal 20, the subscriber terminal 10 transmits a signal to the base station 100. The signal propagates via the transmission path 150 to the vocoder 400 from where the signal further propagates along a path according to known technology to the other subscriber terminal 20. The propagation of the signal from the subscriber terminal 10 via the base station 100, 200, 300 to the vocoder 400 is called a reverse direction.

If the subscriber terminal 10 sets up a connection with the subscriber terminal 20 situated in the coverage area 210 of the base station 200, the signal propagates along a path according to known technology for example to the base station controller 500. The signal propagates from the base station controller 500 to the vocoder 400. The vocoder 400 transmits the signal via the transmission line 250 to the base station 200. The base station 200 transmits the received signal via the radio path to the subscriber terminal 20. The propagation of the signal from the vocoder 400 to the base station 100, 200, 300 and further from the base stations to the subscriber terminal 10, 20 is called a forward direction. Depending on the structure of the cellular radio system, the signal is delayed as it propagates between the different network elements of the system, such as the base stations 100, 200, 300, the vocoder 400 and the base station controller 500. The base stations 100, 200, 300 also cause a delay when they process the signal. It can be assumed, however, that the base stations 100, 200, 300 cause a processing delay that is of substantially equal length. It can also be assumed that the delay occurring in the air interface between the base stations 100, 200, 300 and the subscriber terminal 10 is substantially equal at all the base stations 100, 200, 300 communicating with the subscriber terminal 10.

Assume that the subscriber terminal 10 sets up a connection to the other subscriber terminal 20. The subscriber terminal 10 moves during the connection from the coverage area 110 of the base station 100 to the coverage area 210 of the base station 200, in a manner shown in FIG. 2. When the transition occurs from the coverage area 110 to the other coverage area 210, the cellular radio system employs a soft hand-off so that the connection set up by the subscriber terminal 10 would not be cut off or interfered with. During a soft hand-off, the subscriber terminal 10 communicates simultaneously with both base stations 100, 200 that transmit a signal containing the same data in the reverse direction to the vocoder 400. The vocoder 400 also transmits to each base station 100, 200 a signal containing the same information in the forward direction. The base stations 100, 200 receive the signals transmitted by the vocoder, and each base station 100, 200 transmits the received signal to the subscriber terminal 10.

Figure 3:
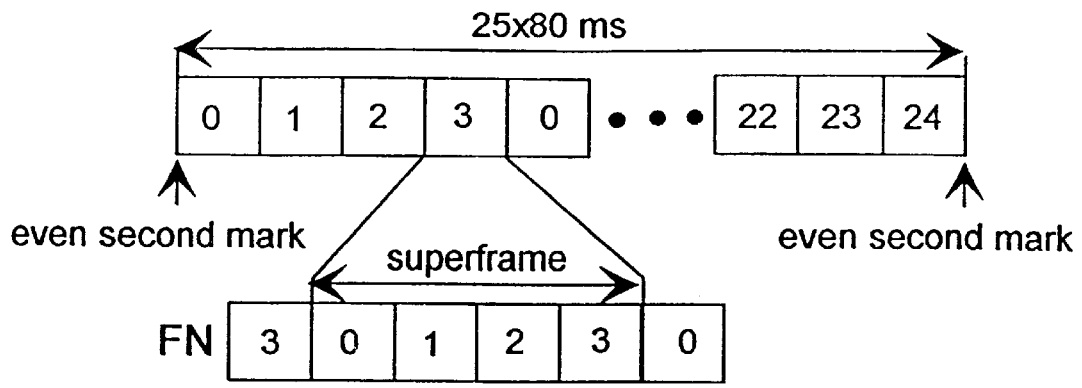
FIG. 3 shows a frame structure where data packets are transmitted.

The signals transmitted by the vocoder 400 and the base station 100, 200, 300 consist of data packets. The signals transmitted by the base stations are also framed. FIG. 3 shows the frame structure of the aforementioned signals. The frames comprise a frame number field FN that is given values for example from zero to three. In the example shown in the figure, four frames constitute a superframe. The frame number depends on the location of the frame in the superframe. The length of the superframe is typically for example 80 ms and the length of the data packet is 20 ms. The figure shows 25 superframes that are numbered from 0 to 24. The beginning of the superframe 0 is synchronized with an even_second mark. The even_second mark is obtained for example from a GPS (Global Positioning System) receiver.

Figure 4:
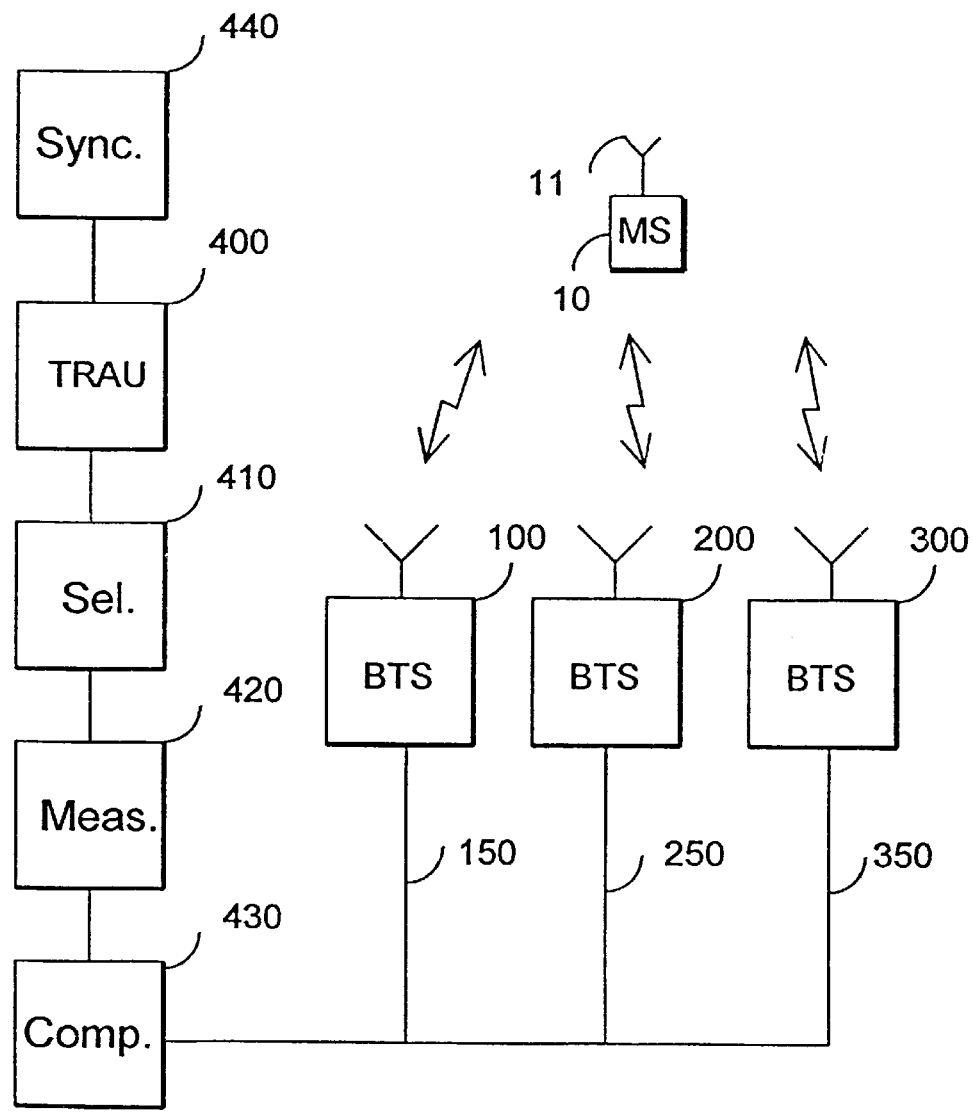
FIG. 4 is a block diagram illustrating in greater detail the structure of the cellular radio system according to the invention.

FIG. 4 is a block diagram illustrating in greater detail the structure of the cellular radio system according to the invention. In the cellular radio system shown in the figure, the subscriber terminal 10 communicates simultaneously with three base stations 100, 200, 300. Each of the base stations 100, 200, 300 transmits the received signal along an individual transmission path 150, 250, 350 to the vocoder 400. The base stations transmit their signal to the vocoder simultaneously. The simultaneous transmission is possible since the base stations are synchronized. Due to the different lengths of the transmission paths 150, 250, 350, the signals are received at the vocoder 400 at different moments. The cellular radio system shown in the figure comprises selection means 410, measuring means 420 and comparing means 430.

The signals transmitted by the base stations 100, 200, 300 are supplied to the comparing means 430 that are arranged to compare the moment of reception of the signals to a predetermined time window. The cellular radio system also comprises measuring means 420 for measuring and comparing the quality of the received signals. If a signal is received at least partly during a predetermined time window, the quality of the signal is measured. The measuring means 420 compare the quality of such signals received by the vocoder that have the same frame number and that contain the same information. The measurement of the signal quality is based for example on the correctness of the signal, the signal-to-noise ratio or some other value describing the signal quality. The measuring means 420 are arranged to distinguish the signals from one another on the basis of the frame numbers used in the frames. Further, the measuring means 420 measure the quality of the signals that are received at intervals equalling at most half of the length of the superframe.

The cellular radio system further comprises selection means 410 for selecting the signal of substantially the best quality among the measured signals on the basis of the measurement and comparison of the signal quality carried out by the measuring means 420. The signal selected by the selection means 410 is routed after the selection for example to the base station controller 500. The selection means only select the signal after all the signals having the same frame number have been received.

The cellular radio system further comprises synchronization means 440. The synchronization means 440 are arranged to synchronize the transmission of the signals by the vocoder to the base stations 100, 200, 300 and the reception of the signals by the vocoder from the base stations 100, 200, 300. The synchronization means 440 synchronize the vocoder 400 in such a way that the vocoder 400 transmits a signal to the base stations 100, 200, 300 substantially at the same moment when it receives the first signal from the base stations 100, 200, 300. In practice, the comparing means 430, the measuring means 420, the selection means 410 and the synchronization means 440 are situated in the vocoder 400. The vocoder 400 is in practice placed in connection with a TRAU. The synchronization means also synchronize the starting moment of the superframe for example with a global time signal or sync pulse.

Figure 5:
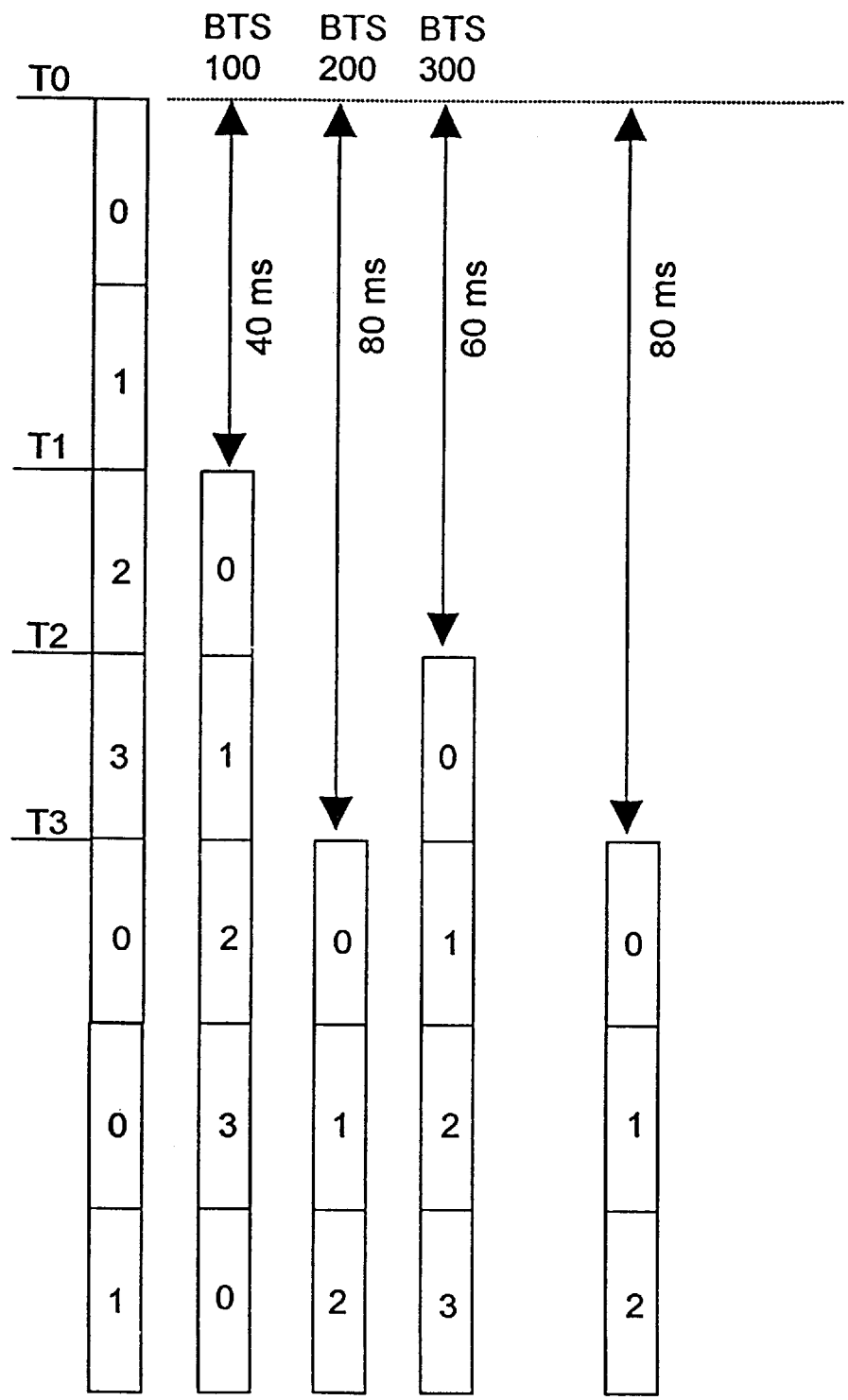
FIG. 5 shows schematically the timing of the selection of the data packets.

FIG. 5 shows schematically the timing of the signal selection. In the figure, the base stations 100, 200, 300 transmit a signal to the vocoder 400. It is assumed in the figure that the passage of time begins when the base stations start transmitting simultaneously at a moment T0. At the moment T0, the base stations transmit a frame with the frame number of zero. Due to the unequal delays of the signals, the signals are received at different times. The vocoder receives first a signal transmitted by the base station 100. The reception takes place at a moment T1. The vocoder 400 receives a signal transmitted by the base station 300 at a moment T2=60 ms and a signal transmitted by the base station 200 at a moment T3=80 ms.

When the signals arrive at the vocoder, the comparing means 430 compare the delay differences to the time window. The time window typically equals at most half of the length of the superframe. In the arrangement shown in the figure, the length of the time window is 40 ms. In the example shown in the figure, all signals arrive at least partly during the time window. In this situation, all three received signals are supplied to the measuring means 420. The measuring means 420 measure and compare the quality of the aforementioned signals. The selection means 410 thereafter select the signal of substantially the best quality of the compared signals on the basis of the measurement carried out previously. In the arrangement shown in the figure, the selection means 410 select the signal of the best quality substantially at the same moment when the vocoder receives the last signal. The selected signal can be for example decoded or supplied to a network element in the cellular radio system, for example to the base station controller.

Even though the invention is described above with reference to the example according to the accompanying drawings, it is clear that the invention is not restricted thereto, but it can be varied in several ways within the scope of the inventive idea disclosed in the appended claims.

I claim:

1. A method for selecting a signal, the method being used in a cellular radio system comprising base stations and at least one vocoder, the base stations and the vocoder transmitting a signal to each other during a soft hand-off, the base stations transmitting a signal to the vocoder substantially simultaneously, and the vocoder receiving the simultaneously transmitted signals at different moments of reception, a first signal of the simultaneously transmitted signals being received at a first moment in time, the method comprising:

comparing the moments of reception of the signals to a predetermined time window, wherein the signals consist of frames, each frame having a frame number, information, and a length;

measuring and comparing quality of the frames that have the same frame number and have the same information, the frames being associated with a particular one of the received signals, the measuring and comparing when the particular one of the received signals arrives at the vocoder during the predetermining time window; and selecting a substantially best signal after all of the signals having the same frame number have been received, selection of the substantially best signal being based upon the measuring and comparing.

2. A method according to claim 1, wherein the signal quality is based for example on the correctness of the signal, the signal-to-noise ratio or some other value describing the signal quality.

3. A method according to claim 1, wherein the frames form a superframe, and wherein different signals are distinguished from one another on the basis of the frame numbers used in the frames.

4. A method according to claim 3, the method comprising measuring the quality of the signals received at intervals equalling at most half of the length of the superframe.

5. A method according to claim 3, wherein the beginning of the superframe is synchronized with an external signal.

6. A method according to claim 1, the method being used during a softer hand-off.

7. A method according to claim 1, wherein the signal transmission and reception by the vocoder are synchronized in such a way that vocoder transmits a signal to the base stations at the substantially same moment it receives the first signal of the simultaneously transmitted signals.

8. A cellular radio system comprising base stations and at least one vocoder, the base stations and the vocoder transmitting a signal to each other during a soft hand-off, the base stations transmitting a signal to the vocoder substantially simultaneously, the vocoder receiving the simultaneously transmitted signals at different moments of reception, a first signal of the simultaneously transmitted signals being received at a first moment in time, the cellular radio system comprising:

comparing means for comparing the moments of reception of the signals to a predetermined time window, wherein the signals consist of frames, each frame having a frame number, information, and a length;

measuring means for measuring and comparing quality of the frames that have the same frame number and have the same information, the frames being associated with a particular one of the received signals, the measuring and comparing when the particular one of the received signals arrives at the vocoder during the predetermined time window; and selection means for selecting a substantially best signal after all of the signals having the same frame number have been received, selection of the substantially best signal being based upon the measuring and comparing.

9. A cellular radio system according to claim 8, wherein the signal quality measured by the measuring means is based for example on the correctness of the signal, the signal-to-noise ratio or some other value describing the signal quality.

10. A cellular radio system according to claim 8, wherein one utilizes a framed signal, the frames forming a superframe, and wherein the measuring means are arranged to distinguish the different signals from one another on the basis of the frame numbers used in the frames.

11. A cellular radio system according to claim 10, wherein the measuring means are arranged to measure the quality of the signals received at intervals equalling at most half of the length of the superframe.

12. A cellular radio system according to claim 10, wherein the synchronization means synchronize the beginning of the superframe with an external signal.

13. A cellular radio system according to claim 8, the system being employed during a soft and/or a softer hand-off.

14. A cellular radio system according to claim 8, the system comprising synchronization means that are arranged to synchronize the transmission and reception of a signal by the vocoder.

15. A cellular radio system according to claim 14, wherein the synchronization means synchronize the vocoder in such a way that it transmits a signal to the base stations at substantially the same moment it receives the first signal of the simultaneously transmitted signals.

* * * * *